United States Patent
Pacak et al.

(10) Patent No.: US 12,017,759 B2
(45) Date of Patent: Jun. 25, 2024

(54) PISTON ENGAGING MEMBER

(71) Applicant: Goodrich Corporation, Charlotte, NC (US)

(72) Inventors: Pawel Pacak, Wroclaw (PL); Karol Stras, Jelenia Gora (PL); Adam Wyszowski, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 331 days.

(21) Appl. No.: 17/386,007

(22) Filed: Jul. 27, 2021

(65) Prior Publication Data

US 2022/0033070 A1    Feb. 3, 2022

(30) Foreign Application Priority Data

Jul. 28, 2020   (PL) .......................... 434832

(51) Int. Cl.
| | |
|---|---|
| F16D 65/84 | (2006.01) |
| B64C 25/44 | (2006.01) |
| F16D 65/097 | (2006.01) |
| F16D 121/04 | (2012.01) |
| F16D 125/06 | (2012.01) |

(52) U.S. Cl.
CPC .......... B64C 25/44 (2013.01); F16D 65/0971 (2013.01); *F16D 2121/04* (2013.01); *F16D 2125/06* (2013.01)

(58) Field of Classification Search
CPC . B64C 25/44; F16D 65/0971; F16D 2121/04; F16D 2125/06; H01Q 17/002; B33Y 40/00
USPC ...................................................... 188/71.5
See application file for complete search history.

(56) References Cited

U.S. PATENT DOCUMENTS

| | | | |
|---|---|---|---|
| 4,147,241 A | 4/1979 | Preniczny et al. | |
| 5,608,967 A | 3/1997 | Swank | |
| 6,349,802 B1 | 2/2002 | Juura | |
| 6,626,787 B2 | 9/2003 | Porter | |
| 7,261,189 B2 | 8/2007 | Kerscher et al. | |
| 10,968,971 B2* | 4/2021 | Herrmann | ............... F16D 55/36 |
| 2012/0152610 A1 | 6/2012 | Keahey et al. | |
| 2019/0242446 A1 | 8/2019 | Steele et al. | |
| 2019/0337220 A1* | 11/2019 | Beyerle | ................ H01Q 17/002 |
| 2020/0049216 A1 | 2/2020 | Herrmann | |
| 2021/0017089 A1* | 1/2021 | Thrasher | ................ B33Y 40/00 |

FOREIGN PATENT DOCUMENTS

| | | |
|---|---|---|
| DE | 102007025113 | 12/2008 |
| DE | 102016202542 | 8/2017 |
| WO | 2018161713 | 9/2018 |

OTHER PUBLICATIONS

EPO, Extended Search Report dated Jan. 7, 2022 in EP Serial No. 21183083.1.

* cited by examiner

*Primary Examiner* — Christopher P Schwartz
(74) *Attorney, Agent, or Firm* — SNELL & WILMER L.L.P.

(57) ABSTRACT

A piston engaging member of a piston assembly for engaging a pressure plate of an aircraft brake system, the engaging member comprising a body having a first side configured to selectably engage with the pressure plate, and a mount on a second side of the body configured to mount the piston engaging member with a piston of the piston assembly wherein the body comprises a cellular structure between the first and second sides.

13 Claims, 5 Drawing Sheets

PISTON ENGAGING MEMBER

CROSS-REFERENCE TO RELATED APPLICATIONS

This application claims priority to, and the benefit of PL Patent Application No. P.434832, filed Jul. 28, 2020, and entitled "PISTON ENGAGING MEMBER" which is incorporated by reference herein in its entirety.

FIELD

The following description relates to a piston engaging member of a piston assembly for engaging a pressure plate of an aircraft brake system. The description also relates to a piston assembly for an aircraft brake system, the piston assembly having a piston engaging member configured to engage with a pressure plate. The description also relates to a method of manufacturing a piston engaging member.

BACKGROUND

Brake systems, such as for aircraft, include friction elements that are brought into engagement with each other when a braking action is required to cause braking. The friction elements are selectively engaged and disengaged by use of one or more piston assemblies. A pressure plate of the brake system is biased by the piston assembly to cause a first set of friction elements to engage with a second set of friction elements which rotate with the wheel. The friction elements can experience very high temperatures when braking. Heat from the friction elements can be transferred to components of the piston assemblies.

SUMMARY

According to an aspect, there is provided a piston engaging member of a piston assembly for engaging a pressure plate of an aircraft brake system, the engaging member comprising a body having a first side configured to selectably engage with the pressure plate, and a mount on a second side of the body configured to mount the piston engaging member with a piston of the piston assembly, wherein the body comprises a cellular structure between the first and second sides.

In accordance with additional or alternative embodiments, the cellular structure comprises a plurality of walls and a plurality of cavities defined by the walls.

In accordance with additional or alternative embodiments, the plurality of walls are arranged in a regular pattern.

In accordance with additional or alternative embodiments, at least one cavity defined by the plurality of walls extends annularly.

In accordance with additional or alternative embodiments, the angle between intersecting walls in at least one cavity is 90 degrees and/or 45 degrees.

In accordance with additional or alternative embodiments, at least some of the walls are axisymmetric about a central axis of the engaging member.

In accordance with additional or alternative embodiments, the walls are angled at 45 degrees relative to a plane of the first side and a first array of walls are angled at 90 degrees relative to a second array of walls, such that the cavities extend annularly and have a square cross-sectional profile.

In accordance with additional or alternative embodiments, at least some of the walls are symmetric about two perpendicular planes each aligned with a piston central axis.

In accordance with additional or alternative embodiments, at least a plurality of the cavities defined by the walls have an octahedron shape.

In accordance with additional or alternative embodiments, the exterior face of the cellular structure at the second side of the body has walls intersecting at 90 degrees.

In accordance with additional or alternative embodiments, the plurality of walls comprise a first wall and a second wall, wherein a thickness of the first wall is greater than a thickness of the second wall.

In accordance with additional or alternative embodiments, the second wall is disposed radially outwardly of the first wall.

In accordance with additional or alternative embodiments, the first wall is one of a first array of walls each having a first thickness and the second wall is one of a second array of walls each having a second thickness.

In accordance with additional or alternative embodiments, the second array of walls extends annularly around the first array of walls.

In accordance with additional or alternative embodiments, the spacing between adjacent walls varies in at least one of an axial, radial and circumferential direction.

In accordance with additional or alternative embodiments, the piston engaging member comprises a first pair of adjacent walls and a second pair of adjacent walls, wherein a first spacing between the first pair of adjacent walls is greater than a second spacing between the second pair of adjacent walls.

In accordance with additional or alternative embodiments, the second pair of adjacent walls extends annularly around the first pair of adjacent walls.

In accordance with additional or alternative embodiments, at least one interface between adjoining walls comprises a chamfer or fillet.

In accordance with additional or alternative embodiments, the cellular structure is a first portion of the body, and the body comprises a second portion, wherein the density of the second portion is greater than the density of the first portion.

In accordance with additional or alternative embodiments, the second portion comprises a solid member.

In accordance with additional or alternative embodiments, the first and second portions are a one-piece construction.

In accordance with additional or alternative embodiments, the first portion is between the first side and the second solid portion in an axial direction.

In accordance with additional or alternative embodiments, the thickness of the first portion is greater than the thickness of the second solid portion in the axial direction.

In accordance with additional or alternative embodiments, the second portion tapers in a radial direction to an outer side.

In accordance with additional or alternative embodiments, the cellular structure comprises a plurality of stacked cellular layers.

In accordance with additional or alternative embodiments, each layer being generally cylindrically shaped.

In accordance with additional or alternative embodiments, the piston engaging member comprises a cover covering the first side of the body.

In accordance with additional or alternative embodiments, the first portion and cover are a one piece construction.

In accordance with additional or alternative embodiments, the cover is a sheet.

In accordance with additional or alternative embodiments, the cover wraps at least partially around the body.

In accordance with additional or alternative embodiments, the cove wraps around a peripheral surface of the body.

In accordance with additional or alternative embodiments, the cover wraps around at least a portion of the second side of the body to secure the cover to the body.

In accordance with additional or alternative embodiments, the piston engagement body is formed by additive manufacturing.

In accordance with additional or alternative embodiments, at least one opening is formed in each of the walls.

In accordance with additional or alternative embodiments, the piston engaging member comprises a plurality of openings in each wall, the openings being spaced axisymmetrically.

According to another aspect, there is provided a method of forming a piston engaging member of a piston assembly for engaging a pressure plate of an aircraft braking assembly, the method comprising forming a body having a first side configured to be brought into and out of contact with the pressure plate, and forming a mount on a second side of the body configured to mount the piston cup with a piston of the piston assembly, wherein the body is formed with a cellular structure between the first and second sides.

In accordance with additional or alternative embodiments, the method comprises forming the cellular structure using additive manufacturing.

In accordance with additional or alternative embodiments, the method comprises forming the cellular structure as a first portion of the body and forming the body with a second portion having a density greater than the density of the first portion.

In accordance with additional or alternative embodiments, the method comprises integrally forming the body of the piston engaging member.

In accordance with additional or alternative embodiments, the cellular structure comprises a plurality of walls and a plurality of cavities defined between the walls, and each of the plurality of walls has an opening, and the method comprises removing residual manufacturing material via the openings.

In accordance with additional or alternative embodiments, there is also provided a piston assembly for engaging a pressure plate of an aircraft brake system, the piston assembly comprising a piston engaging member according to any preceding claim.

In accordance with additional or alternative embodiments, there is also provided an aircraft brake system comprising the piston assembly of any preceding claim.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

Figure 1:
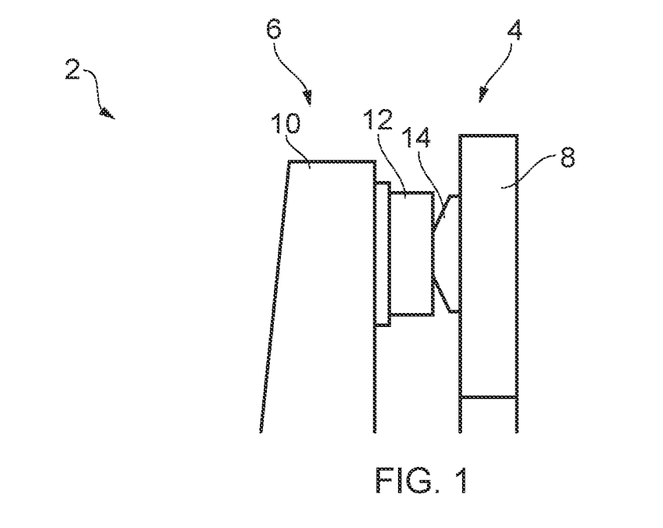
FIG. 1 is a schematic diagram of an aircraft brake system.

An aircraft brake system 2 is illustrated schematically in FIG. 1. The aircraft brake system 2 comprises a braking assembly 4 and a piston assembly 6. The piston assembly 6 actuates the braking assembly 4. One piston assembly 6 is shown, however the piston assembly 6 may be one of a plurality of piston assemblies. The braking assembly 4 acts to brake a wheel of the undercarriage of the aircraft.

Part of the braking assembly 4 is shown in FIG. 1. The braking assembly 4 comprises friction elements (not shown) that are selectively engaged and disengaged. A pressure plate 8 of the braking assembly 4 is biased by the piston assembly 6 to selectively engage and disengage the friction elements. The pressure plate 8 is biased by the piston assembly 6 to cause a first set of stationary friction elements to engage with a second set of rotary friction elements which rotate with a wheel. The biasing action of the piston assembly 6 on the pressure plate 8 provides a braking force. The braking assembly 4 may be suitable for a range of different systems, for example to provide braking to the wheels of an aircraft. When used in an aircraft, the braking assembly 4 is actuated upon landing, and/or during ground operations.

The pressure plate 8 is biased to move in an axial direction by the piston assembly 6 to provide a braking force to the wheels. The piston assembly 6 is hydraulically powered, however it may be powered mechanically, electrically, or pneumatically. There may be one piston assembly 6 or multiple piston assemblies 6 used to provide a braking action.

The piston assembly 6 includes a piston housing 10, a piston 12, and a piston engaging member 14. The piston engaging member 14 is also known as a piston cup 14. The piston 12 is movable in an axial direction of the piston 12 during operation. The piston 12 protrudes from the piston housing 10 and is slidable relative to the piston housing 10. The piston engaging member 14 is at a free end of the piston 12. The piston engaging member 14 is fixedly attached to the piston 12. When the piston assembly 6 is in a disengaged condition from the braking assembly 4, the piston engaging member 14 is retracted from the pressure plate 8 and a gap is provided between the piston engaging member 14 and the pressure plate 8. When the piston assembly 6 is in an engaged condition with the braking assembly 4 as shown in FIG. 1, the piston engaging member 14 engages with the pressure plate 8. FIG. 1 is schematic and a detailed description of the piston assembly 6 and braking assembly 4 is omitted.

Figure 2:
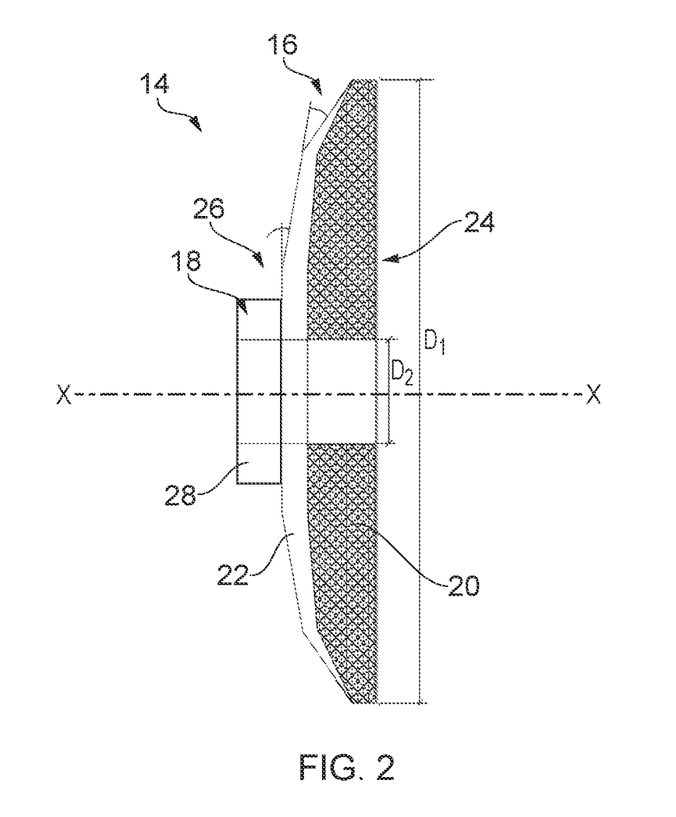
FIG. 2 is a cross-sectional view of a piston engaging member.

The piston engaging member 14 is illustrated in FIG. 2. The piston engaging member 14 has a body 16 and a mount 18. The body 16 selectively engages with the pressure plate 8 and the mount 18 connects with the piston 12. The body 16 comprises a first portion 20 and a second portion 22, and a first side 24 and a second side 26. The first side 24 is a front side facing the pressure plate 8. The second side 26 is a rear side facing the piston 12. The piston engaging member 14 has a central axis X. The terms axial and radial are in relation to the central axis X. In the present arrangement the piston engaging member 14 has a circular profile, however the profile of the piston engaging member 14 may differ. The central axis X of the piston engaging member 14 is co-axial with a longitudinal axis of the piston 12. In embodiments, the central axis X is offset from the longitudinal axis of the piston 12. When assembled, the first portion 20 is located axially between the pressure plate 8 and the second portion 22.

The first side 24 is the side of the body 16 axially closest to the pressure plate 8, and the second side 26 is the side of the body 16 from which the piston 12 extends. The mount 18 is on the second side 26. The piston engaging member 14 may be formed from a range of suitable materials, for example stainless steel, aluminum, titanium, or any other suitable material. Different components of the engaging member may be formed from different materials. Different sections and/or parts of the first portion 20 may be formed from different materials depending on the requirements, or may be formed from the same material.

The mount 18 is on the second side 26 of the body 16. The mount 18 comprises a mounting feature 28, and includes any feature which mounts the piston 12 and allows the piston 12 to extend therefrom. The mount 18 is configured to mount the piston engaging member 14 to the piston 12. The mount 18 is integrally formed with the second portion 22. In embodiments, the mount 18 is a separate component which is attached to the second portion 22 by an appropriate means, for example welded or glued. The mount 18 extends axially from the second side 26 of the body 16 and is shaped to complement a receiving portion of the piston 12 so that the mount 18 attaches the piston engaging member 14 to the piston 12. The mount 18 may be attached to the piston 12 via a shrink fit, welding, a screw fit, and/or using a lock ring, or any other suitable means. An advantage of such an arrangement is that the piston engaging member 14 is interchangeable. In embodiments, the piston engaging member 14 is formed as a one part construction with the piston 12. Alternative mount arrangements may be provided. The mount 18 may be partially or entirely formed in the body 16 of the piston engaging member 14.

Figure 3:
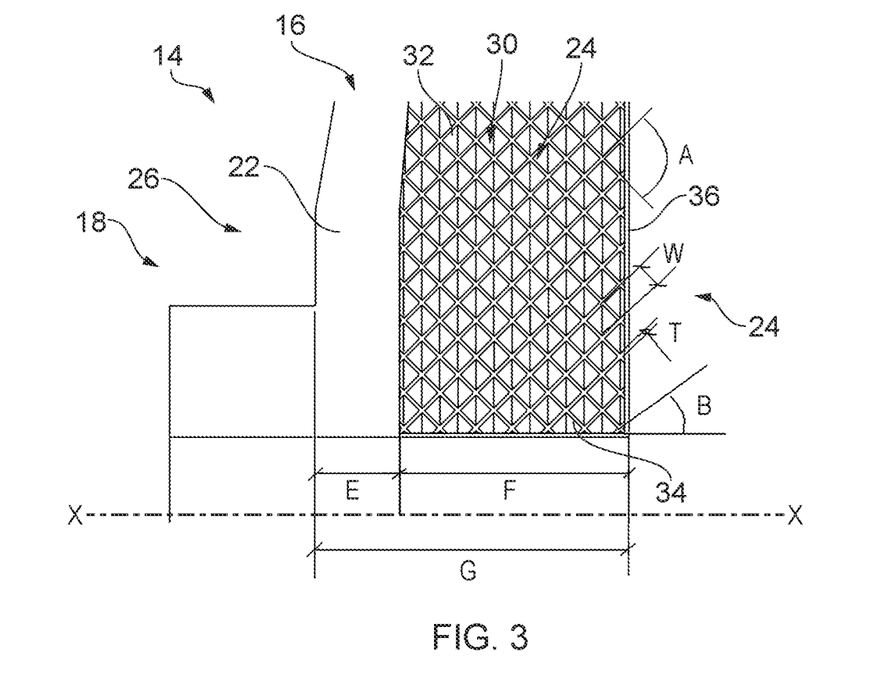
FIG. 3 is a cross-sectional view of a cellular structure of the piston engaging member.

With reference to FIGS. 2 and 3, the first portion 20 and second portion 22 of the body 16 will now be described. The second portion 22 acts as a support for the first portion 20. The first portion 20 is a cellular structure 30. The second portion 22 extends on the second side 26 and the first portion 20 extends on the first side 24. FIG. 2 illustrates the diameter D1 of the first side 24 of the first portion, which in the illustrated embodiment is 57 mm, but other diameter values may be provided. There may also be a hole disposed centrally through the body 15 and attachment portion 18, which has a diameter D2 of 9.5 mm in the disclosed embodiment, but other diameter values may be provided.

The cellular structure 30 comprises a rigid structure defining a plurality of distinct cavities 32 therein. The cavities 32 may be interlinked, but are individually definable. The cellular structure 30 comprises a plurality of walls 34 and a plurality of cavities 32 defined between the walls 34. The walls 34 and cavities 32 are in a regular pattern. This aids distribution of forces through the engaging member. The cellular structure 30 comprises layers of cavities 32 and walls 34 stacked in an axial direction, each layer extending across the body 16. The cellular structure 30 in the present arrangement has a circumferential configuration. In embodiments, there is one layer of walls 34 and cavities 32. The walls 34 and cavities 32 may be arranged in an irregular pattern in embodiments, and may differ in shape and/or size in different areas of the first portion 20. Such an arrangement is described in more detail below.

The provision of cavities 32 in the first portion 20 help to minimize the thermal conductivity of the first portion 20, and thereby aid a reduction in heat transfer between the pressure plate 8 and components of the piston assembly 6 during braking. This helps to minimize any potential damage to the components and allows a greater braking force to be applied without the piston assembly components overheating. Although in this embodiment the cavities 32 are filled with air, they may be filled with another fluid, or a material with a relatively low thermal conductivity, for example a foam. The provision of cavities 32 also provides a weight saving. The cellular structure 30 may have another arrangement, for example the support structure defining the cavities may comprise rods. Such rods may be arranged in a regular pattern to provide the cellular structure (not shown).

FIG. 3 shows a cross-section of the piston engaging member 14 with the arrangement of the cellular structure 30 shown in detail. The angle A between intersecting walls 34 in the present arrangement is 90 degrees. The angle in another arrangement is 45 degrees. It will be appreciated that various wall arrangements could be provided to provide 90 and/or 45 degree angles between the walls 34. These angles are particularly advantageous because they provide a more even load distribution between the walls 34, in particular at the intersections between the walls 34, and help to reduce load peaks compared with other angles. Such walls 34 are at a 0, 90 and/or 45 degree angles B relative to a plane of the outer surface 36 of the piston engaging member 14 nearest the pressure plate 8. That is, the engaging surface. Such an arrangement helps to reduce any pressure peaks in the walls 34. In the illustrated embodiment in FIG. 3, the walls 34 are at 0 degrees or 45 degrees relative to the outer surface 36 of the piston engaging member 14 nearest the pressure plate 8. It will be appreciated that the angle A, B of the walls 34 relative to a plane of the outer surface 36 of the piston engaging member 14 nearest the pressure plate 8 and/or each other may differ. In embodiments, the walls 34 may be at a substantially 0, 90 and/or 45 degree angle relative to a plane of the outer surface 36 of the piston engaging member 14 nearest the pressure plate 8 and/or each other. In embodiments, the angle relative to a plane of the outer surface 36 of the piston engaging member 14 nearest the pressure plate 8 and/or each other may differ, and may be for example 30 degrees.

FIG. 3 also illustrates the wall thicknesses T and cavity widths W, and axial dimensions of the first and second portions. The wall thickness T in the present embodiment is 0.1 mm, but other thicknesses may be provided. The cavity width W in the present embodiment is 0.7 mm, but other thicknesses may be provided. The ratio of cavity width W to wall thickness T is between 2 to 1 and 20 to 1, although ratios outside of this range may be provided. For example, the wall thickness values may result in a higher volume of wall to cavity 32 within the first portion 20 in regions where additional strength is necessary. It is desirable, however, to have the highest cavity ratio possible whilst still achieving the necessary strength. In embodiments, fillets and/or chamfers (not shown) are provided at the wall intersections to reduce stress peaks at the corners. In the illustrated embodiment the first portion has an axial dimension F of 6.3 mm and the second portion has an axial dimension E of 2.3 mm, giving a total axial dimension G of the body of 8.6 mm. Other axial dimensions may be provided.

The first portion 20 is formed using additive manufacturing. This aids the forming of complex shapes of the cellular structure with accuracy. The first portion 20 may alternatively be formed using any other suitable manufacturing methods, for example a casting method.

The second portion 22 of the illustrated piston engaging member 14 is a solid portion. The second portion 22 is formed by additive manufacturing. The second portion 22 may alternatively be formed using different manufacturing methods, for example a casting method. The second portion 22 may also not be a solid portion and may comprise air cavities, for example, albeit a lower volume of air cavities per unit volume of material compared with the first portion 20. Since the first portion 20 has cavities 32 and the second portion 22 is a solid portion or has a lower volume per unit area of cavities, the second portion 22 has a higher density and higher strength per unit area compared with the first portion 20 so that the second portion 22 can provide structural strength to the piston engaging member 14 and can support the first portion 20. The second portion 22 is able to have a higher density, and therefore higher thermal conductivity, compared with the first portion 20 since it is less important for the second portion 22 to have a lower thermal conductivity. This is because the second portion 22 is located axially further from the pressure plate 8 than the first portion 20.

The second portion 22 may be formed from the same material as the walls 34 of the first portion 20 or may be formed from a material with higher strength, the strength being indicative of the Young's Modulus and/or yield stress of the material, than the material forming the walls 34 of the first portion 20. The second portion 22 illustrated tapers radially relative to the piston engaging member central axis X, so that the radially outer region of the second portion 22 is axially thinner than the radially inner portion. This aids pressure distribution across the engaging member. The second portion 22 in this example has three regions which each taper at a higher gradient relative to a perpendicular plane to the central axis X the more spaced they are from the central axis X. Alternatively, the second portion 22 may have a constant tapering gradient or may not be tapered.

Figure 4:
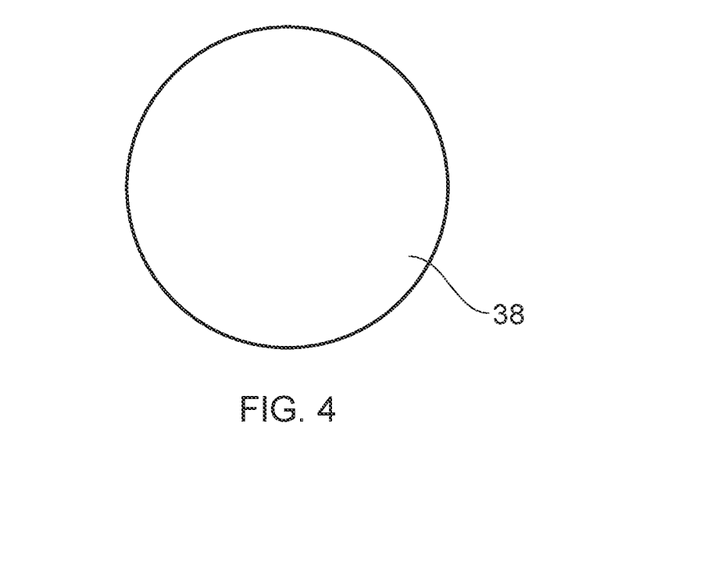
FIG. 4 is a front view of a cover located on a front side of the piston engaging member.
Figure 5:
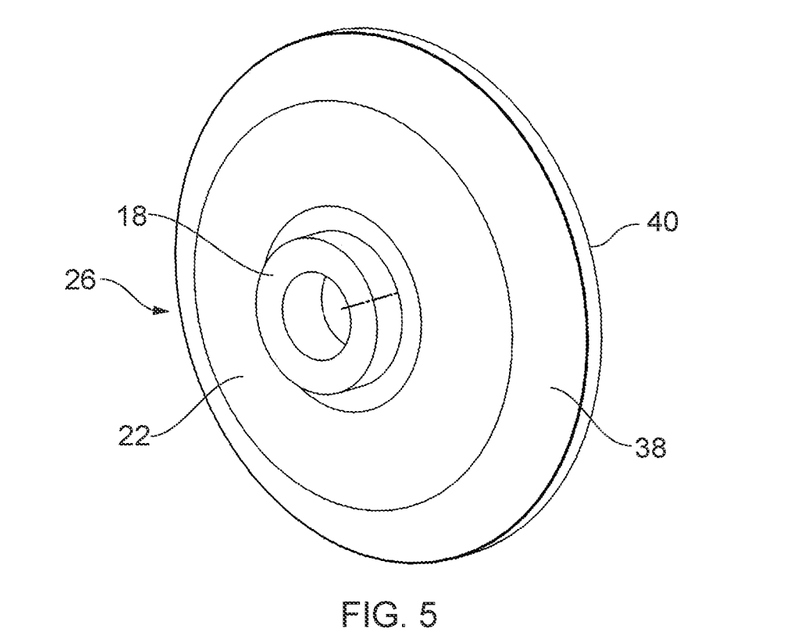
FIG. 5 is a perspective view of the cover from facing rear side of the piston engaging member.
Figure 6:
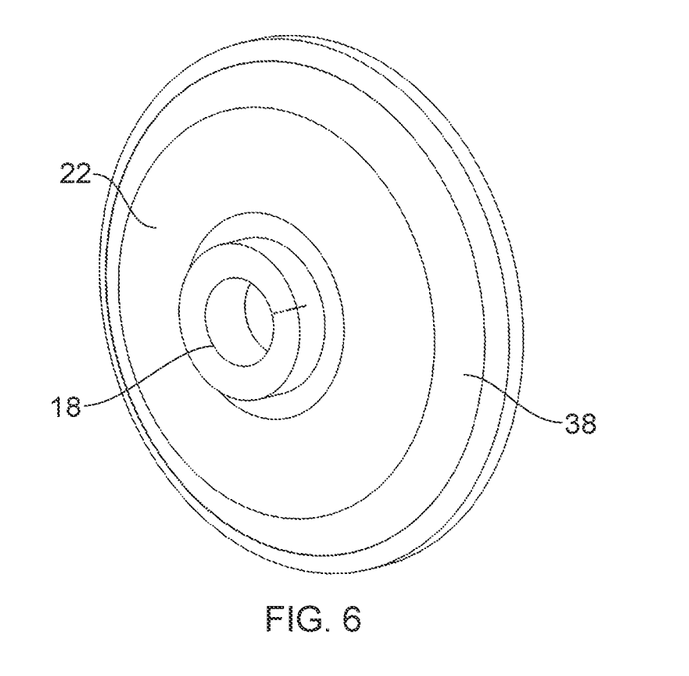
FIG. 6 is a perspective view of another embodiment of a cover from the rear side of the piston engaging member.

As illustrated in FIGS. 4, 5 and 6, a cover 38 is provided on the first side 24 of the body 16. The cover 38 defines the engaging face of the engaging member. This provides a planar surface to be brought into contact with the pressure plate 8. It also restricts debris from entering the cavities 32 in the first portion 20. The cover 38 covers the first side 24. In the present embodiment the cover 38 is a component mounted to the body 16. In embodiments, the cover 38 is integrally formed with the body 16. The body 16 and cover 38 in embodiments is a one piece component. The cover 38 may only cover the first side 24, or may also wrap around a circumferentially extending side 40 of the body 16 to better attach the cover 38 to the body 16 as shown in FIG. 5. As shown in FIG. 6, the cover 38 may also wrap around at least a portion of the second side 26 of the body 16 to aid securing of the cover 38 to the body 16. Lengthening the cover 38 to the second side 26 of the body 16 may also allow some heat from the cover 38 at the first side 24 to be dissipated to the portion of the cover 38 extending around circumferential surface and/or second side 26 of the body 16. The cover 38 may also wrap around the second portion 22 up to the mount 18. The cover is formed from a high temperature steel alloy. Other suitable materials may be used. The cover may be formed from the same material as the body 16.

Figure 7:
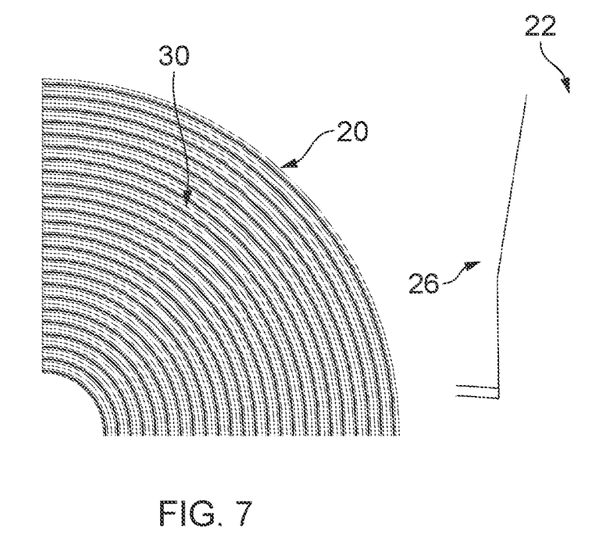
FIG. 7 is a front view of an embodiment of the cellular structure of the piston engaging member from front side of the cellular structure, with the cover omitted.
Figure 8:
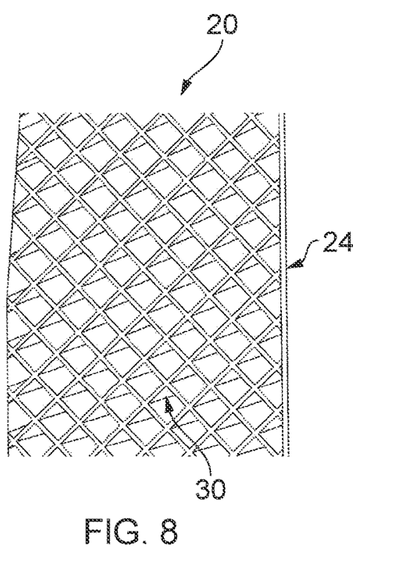
FIG. 8 is a cross-sectional view of the embodiment shown in FIG. 7.

FIGS. 7 and 8 illustrate an embodiment of the first portion 20 of the piston engaging member 14. In this embodiment, the first portion 20 comprises the cellular structure 30 which has walls 34 and cavities 32 which are axisymmetric relative to the central axis X. Providing walls 34 and cavities 32 which are axisymmetric allows a circumferentially even distribution of force. In this embodiment, the walls 34 are in a regular pattern with walls 34 which are angled at 90 degrees relative to each other and angled at 45 degrees relative to the plane of the exterior face of the cellular structure 30 at the first side 24 of the body 16. The cavities 32 extend circumferentially. The cavities 32 have a square cross-section. It will be appreciated that alternative cavity 32 arrangements which are also axisymmetric may be provided.

Figure 9:
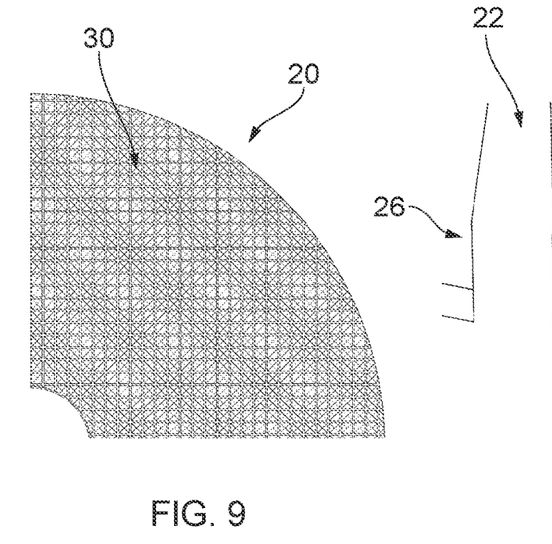
FIG. 9 is a front view of another embodiment of the cellular structure of the piston engaging member from the front side of the cellular structure, with the cover omitted.
Figure 10:
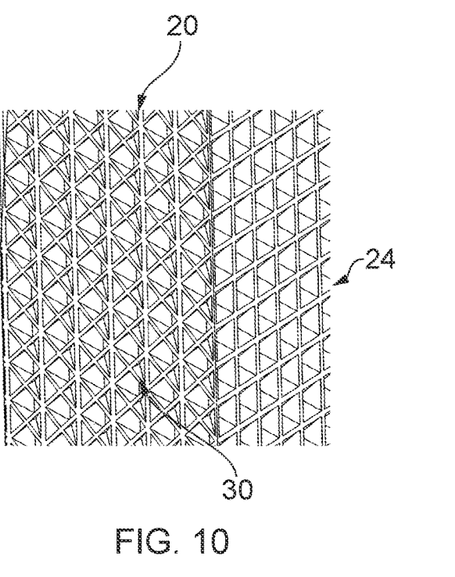
FIG. 10 is a cross-sectional view of the embodiment shown in FIG. 9.

FIGS. 9 and 10 illustrate another embodiment, in which the first portion 20 comprises the cellular structure 30 with walls 34 and cavities 32 which are symmetrical about two perpendicular planes which are each aligned with the central axis X. In this arrangement, the plane of the exterior face of the cellular structure 30 at the first side 24 of the body 16 has walls 34 intersecting at 90 degrees. The walls 34 in the cellular structure 30 define cavities 32 which each have an octahedron shape. In an embodiment, the octahedron shape defined by the cavities 32 is a regular octahedron. Alternatively, the octahedron shape defined by the cavities 32 may have a height which is equal in length to the width of each square defined within each octahedron. This arrangement aids even stress distribution. It will be appreciated that alternative cellular structures which are symmetrical about two perpendicular planes which are aligned with the central axis X may also be provided. Such a regular and symmetrical arrangement provides additional strength of the first portion 20.

In embodiments of any of the above, the walls 34 are arranged so that the cavities 32 defined by the walls 34 of the cellular structure 30 of the first portion 20 change in size in different regions of the first portion 20, depending on heat transfer and/or strength requirements. The cavity sizes may change radially, axially and/or circumferentially. In other words, the spacing between adjacent walls 34 varies in at least one of an axial, radial and circumferential direction in order to change the size of the cavities 32 defined by the walls 34. Adjacent walls 34 defined herein are opposing walls 34 that are adjacent but spaced from each other to define a gap therebetween. In one particular embodiment, the cavity sizes (or spacing between adjacent walls 34) decrease continuously as the first portion 20 extends radially from the central axis X, so that the radially outer region of the first portion 20 has smaller cavity sizes than the radially inner region. This allows a higher density of walls 34 to cavities 32, and therefore greater strength, at the radially outer region of the first portion 20, and a higher cavity density, and therefore lower heat conductivity, at the radially inner region of the first portion 20. This is advantageous because the radially inner region of the first portion 20 generally heats up quicker than the radially outer regions, and therefore heat dissipation in the radially inner region is particularly important. Furthermore, the radially outer portions require additional strength since they are radially further from the attachment portion and therefore may be more prone to bending.

The thickness T of the walls 34 of the cellular structure 30 may additionally or alternatively vary radially, axially and/or circumferentially depending on their position. In embodiments, each individual wall 34 has a constant thickness but walls 34 in different positions of the cellular structure 30 have different thicknesses relative to each other, or the thickness of each wall 34 may vary radially, axially and/or circumferentially such that each individual wall 34 may not have a constant thickness. Advantageously, the wall thickness values may increase continuously as the first portion 20 extends radially from the central axis X to provide additional strength at radially outer regions and decreased thermal conductivity at radially inner regions. In embodiments arrays of walls 34 are provided where the wall thickness values and/or cavity sizes are constant within each array, and the arrays define different regions of the first portion 20. The arrays may include at least two arrays, where a second array extends annularly around a first array and the second array has smaller cavity sizes and/or thicker walls 34 compared with the first array. There may be more than two arrays following the same pattern. The material may also vary in different regions of the first portion 20. For example a radially outer region of the first portion 20 may have walls 34 formed from a stronger material (with a higher Young's Modulus and/or yield stress) which may have a higher thermal conductivity, than the walls 34 in a radially inner region. There may also be more than two different materials used in the same way.

Figure 11:
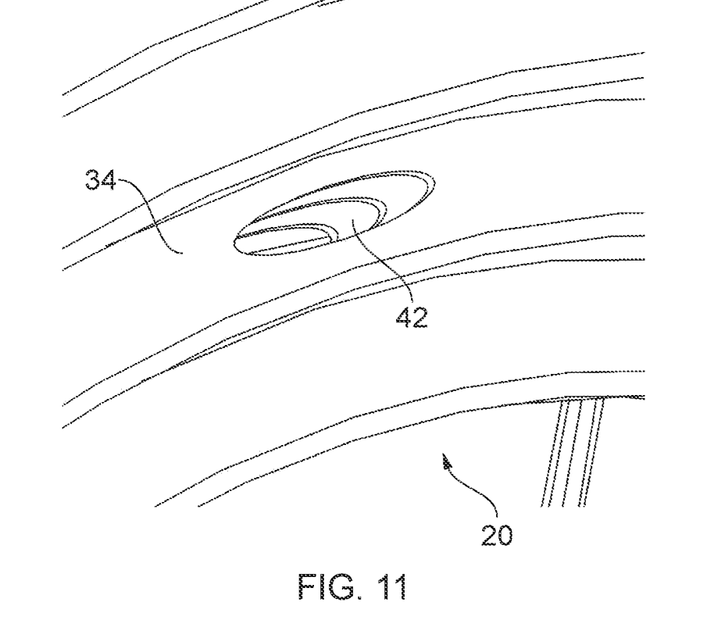
FIG. 11 shows a cellular structure of the piston engaging member with openings formed in the walls.
Figure 12:
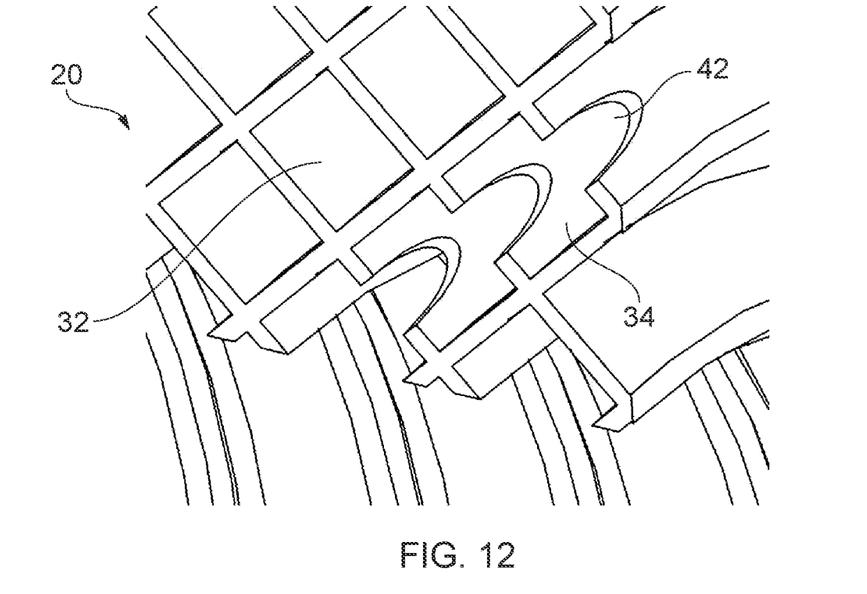
FIG. 12 shows a cut-out of the cellular structure with the openings of FIG. 11.

As illustrated in FIGS. 11 and 12, openings 42 are formed in at least some of the walls 34 of the cellular structure 30. This provides an outlet path to allow any residue material within the cavities 32 as a result of additive manufacturing to be removed subsequent to forming the first portion 20. There is advantageously an opening 42 formed in at least one wall 34 surrounding each cavity 32, such that material can be removed from each individual cavity 32. In embodiments, multiple openings 42 are formed in each wall 34 and the openings 42 may be circumferentially evenly spaced apart to provide symmetry about the central axis X so that the weaker areas where the openings 42 are located are evenly distributed about the axis X. The openings 42 illustrated are oval shaped holes but alternative shapes may be provided, for example circle shapes.

A method of manufacturing a piston engaging member 14 will now be described. The piston engaging member 14, including the mount 18, body 16 and cover 38 may be formed as one-piece using additive manufacturing. The mount 18 may alternatively be formed separately and attached to the body 16, as described previously. The cover 38 may be formed separately for example as a sheet and attached to body 16 using any suitable means for example gluing and/or welding. The sheet may be wrapped around the body 16 and then secured in place. Forming the first and second portions 24, 26 and optionally the mount 18 of the body 16 as one-piece using additive manufacturing helps to reduce the necessary manufacturing steps and form a stronger component. As mentioned previously, the walls 34 may contain openings 42. Once the additive manufacturing is complete, any residual additive manufacturing material can be removed via the openings 42 using any suitable method, for example vibrating the component to allow the material to fall out of the openings 42 and/or submerging the component in a liquid to allow the material to float out of the holes. Once the piston engaging member 14 has been formed it is attached to the piston 12 via the mount 18 using any suitable means, for example welding, gluing, press fitting, and/or a screw fitting. The piston engaging member 14 may alternatively be formed as a one-piece component with the piston 12.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the claims. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A piston engaging member of a piston assembly for engaging a pressure plate of an aircraft brake system, the engaging member comprising:
 a body having a first side and a second side, the first side being configured to selectably engage with the pressure plate; and
 a mount on the second side of the body configured to mount the piston engaging member with a piston of the piston assembly;
 wherein the body comprises a first portion and a second portion, the first portion being adjacent to the first side and the second portion being adjacent to the second side, the first portion spacing the second portion from a pressure plate engaging face at the first side of the body, the first portion being a cellular structure comprising a plurality of walls and a plurality of cavities defined by the walls, the second portion acting as a support for the first portion, and the density of the second portion being greater than the density of the first portion.

2. The piston engaging member of claim 1, wherein the plurality of walls comprise a first wall and a second wall, wherein a thickness of the first wall is greater than a thickness of the second wall.

3. The piston engaging member of claim 2, wherein the second wall is disposed radially outwardly of the first wall.

4. The piston engaging member of claim 1, wherein the plurality of walls are arranged in a regular pattern.

5. The piston engaging member of claim 1, wherein the angle between intersecting walls in at least one cavity is 90 degrees and/or 45 degrees.

6. The piston engaging member of claim 1, wherein the spacing between adjacent walls varies in at least one of an axial, radial and circumferential direction.

7. The piston engaging member of claim 1, comprising a cover at the first side of the body.

8. The piston engaging member of claim 1, wherein at least two of the first portion, the second portion, and the mount are a one piece construction.

9. The piston engaging member of claim 1, wherein the cellular structure is formed by additive manufacturing.

10. A piston assembly for engaging a pressure plate of an aircraft brake system, the piston assembly comprising a piston engaging member according to claim 1.

11. A method of forming a piston engaging member of a piston assembly for engaging a pressure plate of an aircraft braking assembly, the method comprising:

forming a body having a first side and a second side, the first side configured to be brought into and out of contact with the pressure plate; and forming a mount on a second side of the body configured to mount the piston engaging member with a piston of the piston assembly;

wherein the body comprises a first portion and a second portion, the first portion being adjacent to the first side and the second portion being adjacent to the second side, the first portion spacing the second portion from a pressure plate engaging face at the first side of the body, the first portion being a cellular structure comprising a plurality of walls and a plurality of cavities defined by the walls, the second portion acting as a support for the first portion, and the density of the second portion being greater than the density of the first portion.

12. The method of claim 11 comprising forming the cellular structure using additive manufacturing.

13. A piston engaging member of a piston assembly for engaging a pressure plate of an aircraft brake system, the engaging member comprising:

a body having a first side configured to selectably engage with the pressure plate; and a mount on a second side of the body configured to mount the piston engaging member with a piston of the piston assembly;

wherein the body comprises a cellular structure between the first and second sides;

wherein the cellular structure comprises a plurality of walls and a plurality of cavities defined by the walls; and the angle between intersecting walls in at least one cavity is 45 degrees.

* * * * *